US011519931B2

(12) United States Patent
Kim et al.

(10) Patent No.: US 11,519,931 B2
(45) Date of Patent: Dec. 6, 2022

(54) APPARATUS AND METHOD FOR ESTIMATING MOTOR RPM IN ELECTRONIC BRAKE SYSTEM

(71) Applicant: HYUNDAI MOBIS CO., LTD., Seoul (KR)

(72) Inventors: Jung Hoon Kim, Yongin-si (KR); Bong Ju Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 363 days.

(21) Appl. No.: 16/850,453

(22) Filed: Apr. 16, 2020

(65) Prior Publication Data

US 2020/0333374 A1      Oct. 22, 2020

(30) Foreign Application Priority Data

Apr. 18, 2019   (KR) .................. 10-2019-0045338

(51) Int. Cl.
| | |
|---|---|
| *H02P 7/00* | (2016.01) |
| *G01P 3/484* | (2006.01) |
| *H02P 29/40* | (2016.01) |
| *G01D 5/244* | (2006.01) |

(52) U.S. Cl.
CPC .......... *G01P 3/484* (2013.01); *G01D 5/24495* (2013.01); *H02P 29/40* (2016.02)

(58) Field of Classification Search
CPC ..... G01P 3/484; G01D 5/24495; H02P 29/40; H02P 6/182; H02P 6/12
See application file for complete search history.

(56) References Cited

U.S. PATENT DOCUMENTS

| | | | |
|---|---|---|---|
| 4,090,114 A | * | 5/1978 | Thompson |
| 9,979,334 B2 | | 5/2018 | Yun et al. |
| 10,175,260 B2 | | 1/2019 | Lee |
| 2004/0107071 A1 | | 6/2004 | Gerlach |

(Continued)

FOREIGN PATENT DOCUMENTS

| | | |
|---|---|---|
| CN | 1807165 | 7/2006 |
| CN | 105680744 A | 6/2016 |

(Continued)

OTHER PUBLICATIONS

Office Action dated Jun. 17, 2022 from the Chinese Patent Office for Chinese Patent Application No. 202010619073.4.

*Primary Examiner* — Karen Masih
(74) *Attorney, Agent, or Firm* — H.C. Park & Associates, PLC

(57) ABSTRACT

An apparatus for estimating a motor RPM in an electronic brake system may include: a current signal amplifier configured to amplify a voltage applied across a motor driver by a current which flows while the motor driver is turned on, the motor driver being included in a motor driving circuit configured to apply motor driving power to a motor or remove the motor driving power according to a switch-on/off of the motor driver; and a controller configured to detect a waveform with a one-period time from periodically repeated waveforms by processing the signal waveform amplified by the current signal amplifier, calculate a one-rotation time based on the one-period time and the number of commutators of the motor, and calculate a motor RPM using the one-rotation time.

16 Claims, 7 Drawing Sheets

(56) References Cited

U.S. PATENT DOCUMENTS

| | | |
|---|---|---|
| 2006/0158033 A1 | 7/2006 | Ohkubo et al. |
| 2007/0014057 A1 | 1/2007 | Jeon |
| 2011/0033322 A1 | 2/2011 | Barthel et al. |

FOREIGN PATENT DOCUMENTS

| | | |
|---|---|---|
| CN | 106599749 A | 4/2017 |
| CN | 107425766 A | 12/2017 |
| DE | 198 34 108 C2 | 6/2001 |
| DE | 101 26 169 | 12/2002 |
| DE | 10 2008 040 927 | 4/2009 |
| DE | 10 2008 018 818 | 10/2009 |
| JP | 2016-208656 | 12/2016 |
| KR | 10-2006-0103913 | 10/2006 |
| KR | 10-2017-0008381 | 1/2017 |

\* cited by examiner

APPARATUS AND METHOD FOR ESTIMATING MOTOR RPM IN ELECTRONIC BRAKE SYSTEM

CROSS-REFERENCE TO RELATED APPLICATION

This application claims priority from and the benefit of Korean Patent Application No. 10-2019-0045338 filed on Apr. 18, 2019, which is hereby incorporated by reference for all purposes as if set forth herein.

BACKGROUND

Field

Exemplary embodiments of the present disclosure relate to an apparatus and method for estimating a motor rotation per minute (RPM) in an electronic brake system, and more particularly, to an apparatus and method for estimating a motor RPM in an electronic brake system, which can estimate a motor RPM while driving power is applied to a direct current (DC) motor used for the electronic brake system.

Discussion of the Background

In general, a DC motor has a field magnet which generates a stationary magnetic field and two or more armature coils which are distributed to interlink magnetic fluxes of the stationary magnetic field.

The armature coil includes a pair of brushes and a plurality of commutators, and is connected to a motor driving power supply (ex. battery) through a power line.

The commutators sequentially connect the armature coils to the brush to generate a rotating magnetic field that generates a rotational force through an interactive action with the stationary magnetic field. Between the respective commutators, an insulating member is interposed.

The DC motor having such a configuration measures an RPM for speed control or the like. FIG. 1 illustrates a conventional motor driving circuit configured to apply motor driving power BAT to a motor MTR or remove the motor driving power BAT according to a switch on/off of a motor driver SW. As illustrated in FIG. 1, the conventional motor driving circuit includes a counter electromotive voltage measurement and RPM estimation unit 10 which is connected between the motor driver SW and the motor MTR and serves to measure a counter electromotive voltage generated by inertial rotation of the motor MTR when the motor driving power BAT which has been applied to the motor MTR to rotate the motor MTR is removed, and estimate a motor RPM corresponding to the measured counter electromotive voltage using a preset lookup table (i.e. motor RPM conversion table).

In the conventional motor RPM estimation method, however, the motor driver SW needs to be turned off in order to measure the counter electromotive voltage (that is because the counter electromotive voltage proportional to the RPM of the motor is generated, the motor rotating on its own when the power applied to the motor is removed), as illustrated in FIG. 2. Furthermore, while the motor driver SW is turned on to supply power to the motor MTR, the counter electromotive voltage cannot be measured. Thus, the motor RPM cannot be estimated.

When the motor driver SW is turned off to remove the power supply, the RPM of the motor MTR is reduced, and the counter electromotive voltage can be measured at a terminal of the motor MTR only after a predetermined time (i.e. motor freewheeling current time consumption) has elapsed for stabilization of the counter electromotive voltage. Therefore, the motor RPM cannot be accurately estimated.

In other words, the method for estimating a motor RPM using a counter electromotive voltage cannot estimate a motor RPM while the motor driver SW is turned on to supply power to the motor MTR. Only while the motor driver SW is turned off to remove the motor driving power, the method can estimate a motor RPM. Even in this case, the method can estimate a motor RPM only after the counter electromotive voltage stabilization time has elapsed. Thus, the motor RPM cannot be accurately estimated. During this process, an RPM variation (i.e. maximum RPM—minimum RPM) may be increased to have an influence on control performance and noise generation.

Furthermore, the values of "counter electromotive voltage-motor RPM conversion table", which are used when a motor RPM is estimated through the counter electromotive voltage, are fixed. Thus, although the same types of motors MTR are used, a performance difference may occur depending on the used motor samples. In this case, a motor RPM estimation error may increase.

Therefore, there is a need for a method capable of estimating a motor RPM while the motor driver SW is turned on to supply power to the motor MTR.

The above information disclosed in this Background section is only for enhancement of understanding of the background of the invention and, therefore, it may contain information that does not constitute prior art.

SUMMARY

Exemplary embodiments of the present invention are directed to an apparatus and method for estimating a motor RPM in an electronic brake system, which can estimate a motor RPM while driving power is applied to a DC motor used for the electronic brake system.

In an embodiment, an apparatus for estimating a motor RPM in an electronic brake system may include: a current signal amplifier configured to amplify a voltage applied across a motor driver by a current which flows while the motor driver is turned on, the motor driver being included in a motor driving circuit configured to apply motor driving power to a motor or remove the motor driving power according to a switch-on/off of the motor driver; and a controller configured to detect a waveform with a one-period time from periodically repeated waveforms by processing the signal waveform amplified by the current signal amplifier, calculate a one-rotation time based on the one-period time and the number of commutators of the motor, and calculate a motor RPM using the one-rotation time.

The voltage applied across the motor driver may be a voltage corresponding to (motor current*resistance of motor driver).

The number of the periodically repeated waveforms may correspond to the number of commutators of the motor.

The controller may sample signal waveforms which are generated during rotation of a motor, detect slopes using differences between adjacent sampling data, determine a maximum peak and a minimum peak using slope changes based on the differences between the sampling data and the accumulated number of slopes, and calculate the one-period time using sampling speed and the number of sampling data accumulated between the same peaks.

The controller may accumulate positive slopes between adjacent sampling data, maintain a predetermined number or more of positive slopes, and then determine a point, where the slope changes to a negative slope, as the maximum peak. The controller may accumulate negative slopes between adjacent sampling data, maintain a predetermined number or more of negative slopes, and determine a point, where the slope changes to a positive slope, as the minimum peak.

The predetermined number of accumulated slopes may be designated according to the specification of the motor and the sampling speed.

The controller may continuously accumulate the number of slopes between the sampling data until a peak designated for period determination is determined. The controller may determine that a portion where the slope characteristic changes while the number of accumulated slopes having the same characteristic does not reach a predetermined number is a noise signal, and filter the noise signal.

The speed or interval of the sampling may be set in consideration of influence on the load factor or the computation performance or of the controller.

The controller may apply a moving average method to the motor RPM calculated for each of the waveforms, ignore a motor RPM which is less than or more than the minimum/maximum value of a physical variation in the motor RPM, and additionally perform RPM calculation data processing to correct an error of the calculated motor RPM.

In an embodiment, a method for estimating a motor RPM in an electronic brake system may include: detecting and amplifying, by a current signal amplifier, a voltage applied across a motor driver by a current which flows while the motor driver is turned on, the motor driver being included in a motor driving circuit configured to apply motor driving power to a motor or remove the motor driving power according to a switch-on/off of the motor driver; detecting, by a controller, a waveform with a one-period time from periodically repeated waveforms by processing the signal waveform amplified by the current signal amplifier; calculating, by the controller, a one-rotation time by multiplying the one-period time by the number of commutators of the motor; and calculating, by the controller, a motor RPM using the one-rotation time.

In order to calculate the one-period time of the waveform, the controller may sample signal waveforms which are generated during rotation of a motor, detects slopes using differences between adjacent sampling data, determine a maximum peak and a minimum peak using slope changes based on the differences between the sampling data and the accumulated number of slopes, and calculate the one-period time using sampling speed and the number of sampling data accumulated between the same peaks.

The voltage applied across the motor driver may be a voltage corresponding to (motor current*resistance of motor driver).

The number of the periodically repeated waveforms may correspond to the number of commutators of the motor.

The controller may accumulate positive slopes between adjacent sampling data, maintain a predetermined number or more of positive slopes, and then determine a point, where the slope changes to a negative slope, as the maximum peak. The controller may accumulate negative slopes between adjacent sampling data, maintain a predetermined number or more of negative slopes, and determines a point, where the slope changes to a positive slope, as the minimum peak.

While continuously accumulating the number of slopes between the sampling data until the designated peak is determined, the controller may determine that a portion where the slope characteristic changes while the number of accumulated slopes having the same characteristic does not reach a predetermined number is a noise signal, and filter the noise signal.

The method may further include applying, by the controller, a moving average method to the motor RPM calculated for each of the waveforms, ignoring a motor RPM which is less than or more than the minimum/maximum value of a physical variation in the motor RPM, and performing RPM calculation data processing to correct an error of the calculated motor RPM, after the calculating of the motor RPM.

In accordance with the present embodiment, the apparatus and method for estimating a motor RPM can estimate the RPM of the motor more accurately while driving power is applied to the DC motor used for the electronic brake system, reduce noise generation while improving motor control performance, and reduce a motor RPM estimation error by a motor sample deviation.

It is to be understood that both the foregoing general description and the following detailed descriptions are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
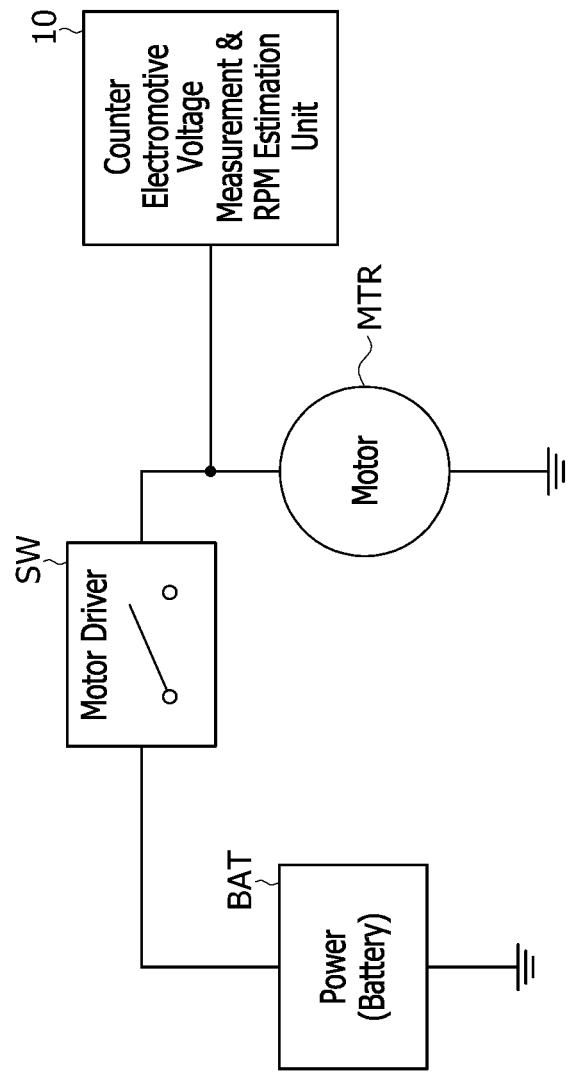
FIG. 1 is a diagram illustrating a schematic configuration of a conventional apparatus for estimating a motor RPM.
Figure 2:
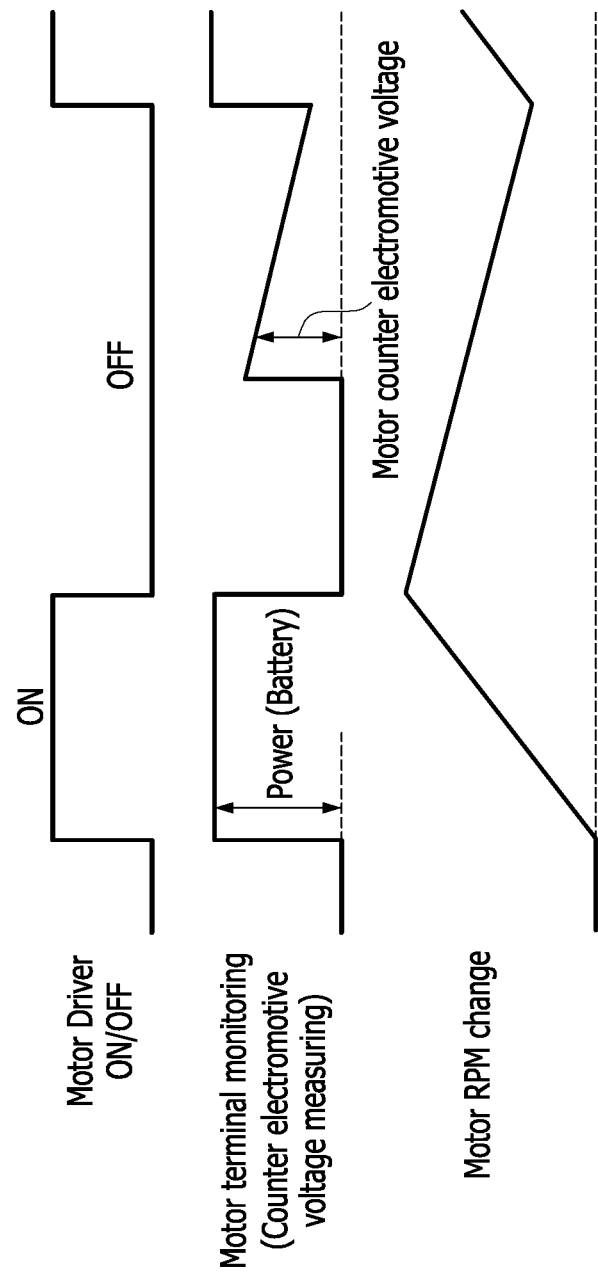
FIG. 2 is a diagram for describing a method for estimating a motor RPM by measuring a counter electromotive voltage in FIG. 1.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

The advantages and characteristics of the present disclosure and a method for achieving the advantages and characteristics will be clarified through the following embodiments which will be described in detail with reference to the accompanying drawings. However, it should understood that the present disclosure is not limited to the following embodiments, can be embodied in various different forms, and includes all modifications, equivalents or substitutes which are included in the spirit and technical range of the present disclosure. The following embodiments are provided to complete the disclosure of the present disclosure, such that the scope of the present disclosure can be fully understood by those skilled in the art to which the present disclosure pertains. In describing the present disclosure, detailed descriptions for related publicly-known functions or configurations will be ruled out in order not to unnecessarily obscure subject matters of the present disclosure.

The terms used in this application are only used to describe a specific embodiment, and not intended to limit the present disclosure. The terms of a singular form may include plural forms unless referred to the contrary. In this specification, it should be understood that the meaning of "include" or "have" specifies a property, a number, a step, a process, an element, a component, or combinations thereof, but does not exclude in advance one or more other properties, numbers, steps, processes, elements, components, or combinations thereof. The terms such as first and second may be used to describe various elements, but the elements should not be limited by the terms. The terms are used only to distinguish one element from another element.

Hereinafter, an apparatus and method for estimating a motor RPM will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 3:
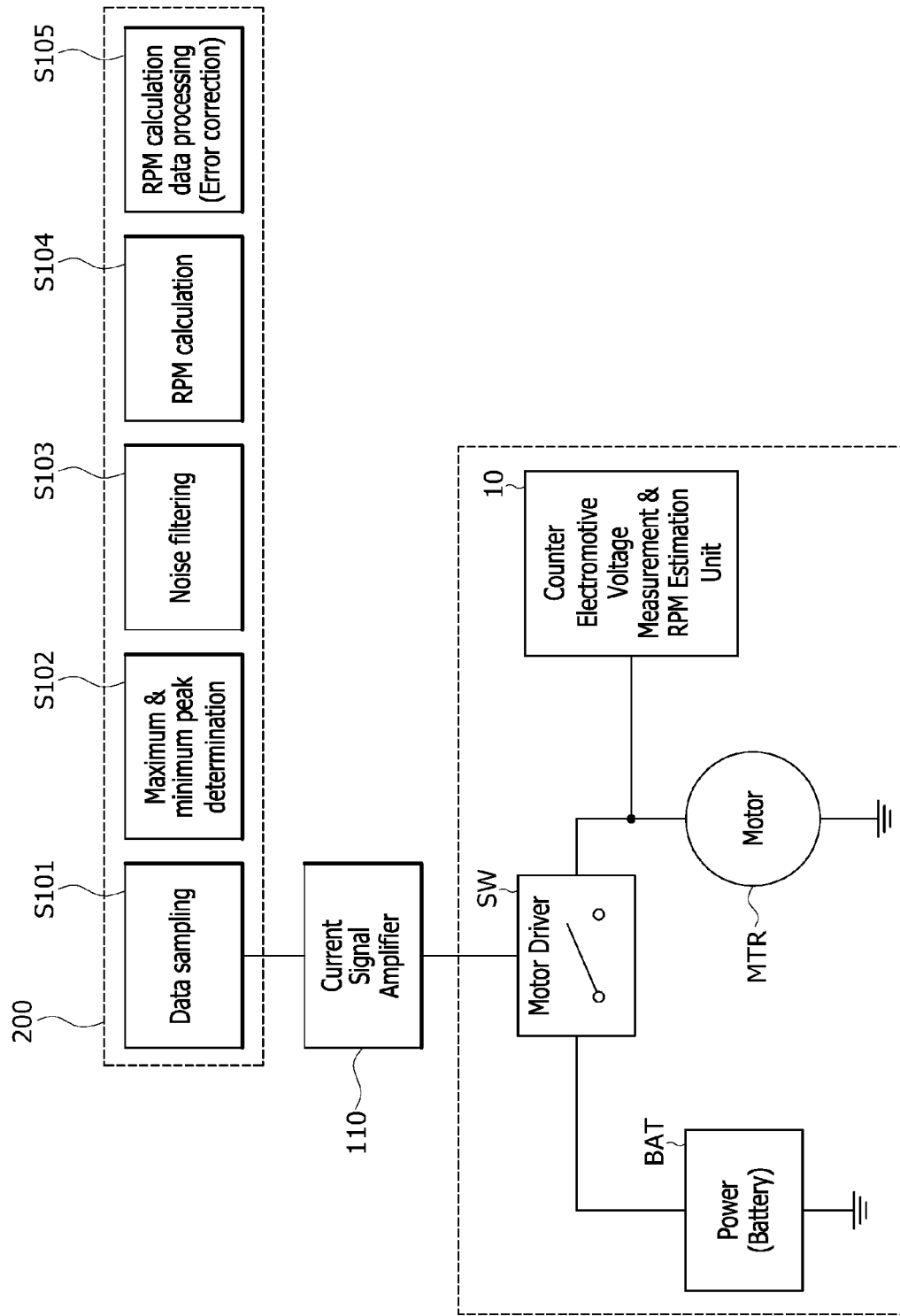
FIG. 3 is a diagram illustrating a schematic configuration of an apparatus for estimating a motor RPM in an electronic brake system in accordance with an embodiment of the present disclosure.

FIG. 3 is a diagram illustrating a schematic configuration of an apparatus for estimating a motor RPM in an electronic brake system in accordance with an embodiment of the present disclosure.

As illustrated in FIG. 3, the apparatus for estimating a motor RPM in an electronic brake system in accordance with the embodiment of the present disclosure includes a current signal amplifier 110 and a controller 200 in a motor driving circuit which applies motor driving power BAT to a motor MTR or removes the motor driving power BAT according to a switch on/off of a motor driver SW. The current signal amplifier 110 amplifies a voltage applied across the motor driver SW by a current which flows while the motor driver SW is turned on (ON) (i.e. voltage corresponding to current=motor current A*resistance R of motor driver SW) or a voltage difference. The controller 200 detects a waveform having a one-period time t from periodically repeated waveforms by processing the current signal amplified by the current signal amplifier 110 (i.e. the voltage corresponding to the current), calculates a one-rotation time T (T=t*N) by multiplying the one-period time t by the number N of commutators of the motor, and then calculates a motor RPM (=60 sec/T) using the one-rotation time T.

Figure 4:
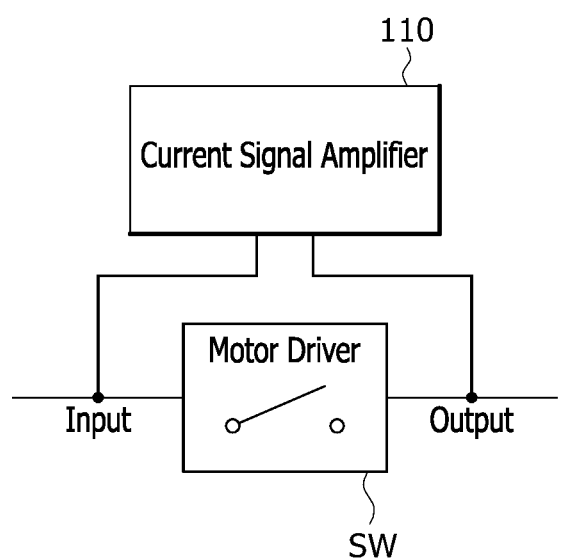
FIG. 4 is a diagram illustrating a connection configuration of a current signal amplifier in FIG. 3.

FIG. 4 is a diagram illustrating a connection configuration of the current signal amplifier in FIG. 3. As illustrated in FIG. 4, the current signal amplifier 110 senses and amplifies the voltage applied across the motor driver SW by the current which flows while the motor driver SW is turned on (ON) (i.e. voltage corresponding to current=motor current A*resistance R of motor driver SW) or a voltage difference.

For reference, it has been described in the present embodiment that the motor driver SW detects a current waveform by rotation of the motor. However, the present embodiment is not limited thereto, but a counter voltage element of the motor may detect a current waveform, and a separate resistor for sensing a motor current may be added to detect a current waveform. That is, the detection position of a current waveform detected during rotation of the motor is not limited.

Figure 5:
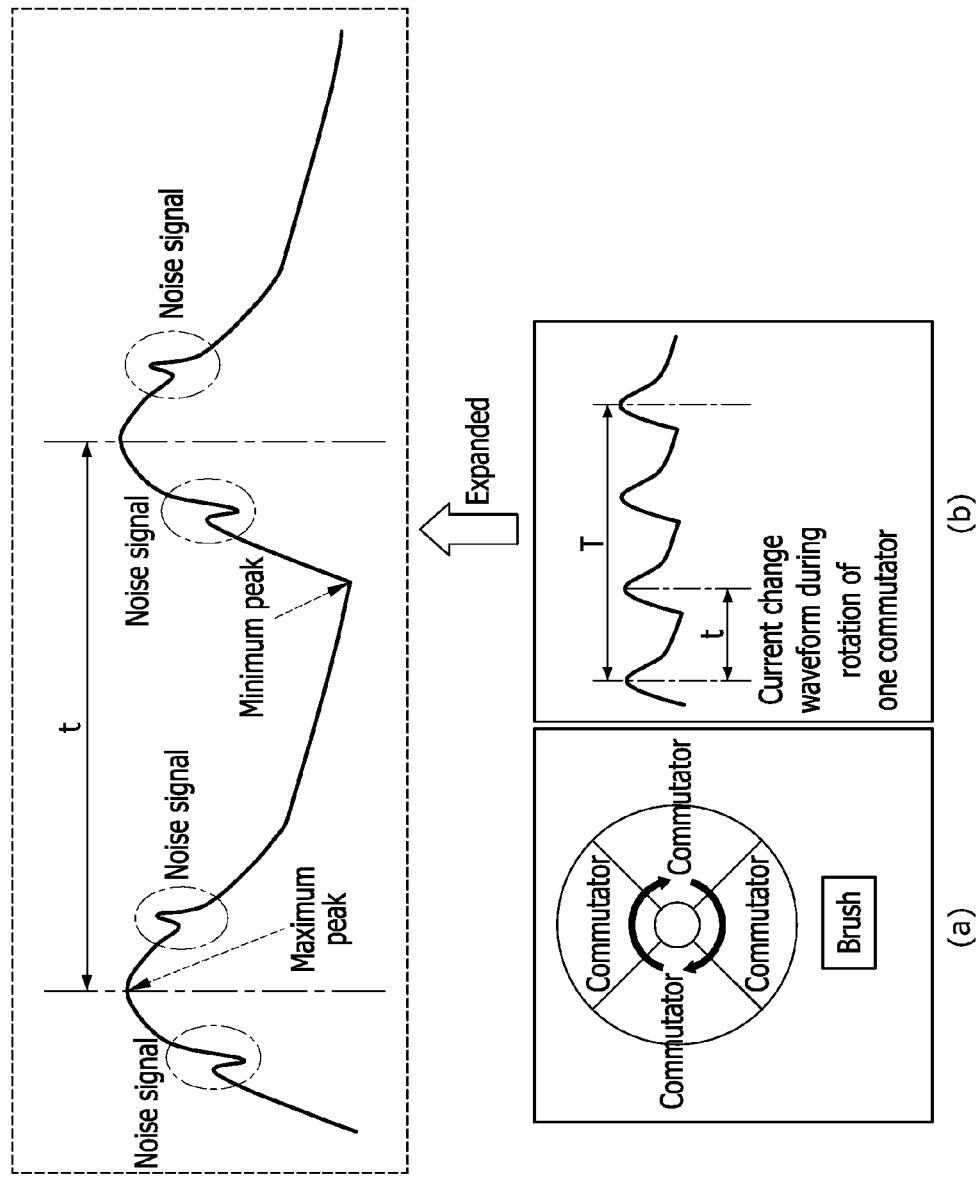
FIG. 5 is a diagram illustrating a current waveform which is detected in response to the number of commutators during rotation of a motor, in FIG. 3.

FIG. 5 is a diagram illustrating a current waveform which is detected in response to the number of commutators during rotation of the motor, in FIG. 3.

When it is assumed that the number of commutators of the DC motor is four as illustrated in FIG. 5, four waveforms which are repeated in the same manner are generated during one rotation due to the characteristics of the motor. That is, the number of waveforms which are generated during one rotation of the motor corresponds to the number N of commutators (or commutator slots) of the corresponding motor. Therefore, the one-period time t of each of the waveforms generated during rotation of the motor may be calculated and multiplied by the number N of commutators of the motor, in order to calculate the one-rotation time (T=t*N) of the motor.

At this time, since the number N of commutators of the motor is already known, the motor RPM (=60 sec/T) an be calculated through the one-rotation time (T=t*N), as long as the one-period time t of each of the waveforms generated during rotation of the motor can be calculated. Hereafter, in the present embodiment, the method for calculating the one-period time t of each of the waveforms generated during rotation of the motor will be described in more detail.

Referring to an expanded view of the waveform generated during rotation of the motor (i.e. the waveform amplified through the current signal amplifier 110) in FIG. 5, the maximum peaks of the waveform may also be detected to calculate the one-period time t of the waveform. The minimum peaks of the waveform may be detected to calculate the one-period time t of the waveform. For convenience of description, however, the descriptions of the present embodiment will be focused on the method for detecting the maximum peaks of the waveform to calculate the one-period time t of the waveform.

Referring to FIG. 5, the waveform generated during rotation of the motor (i.e. the waveform amplified through the current signal amplifier 110) contains a noise signal, and the noise signal illustrated in FIG. 5 is exaggerated for description.

Figure 6:
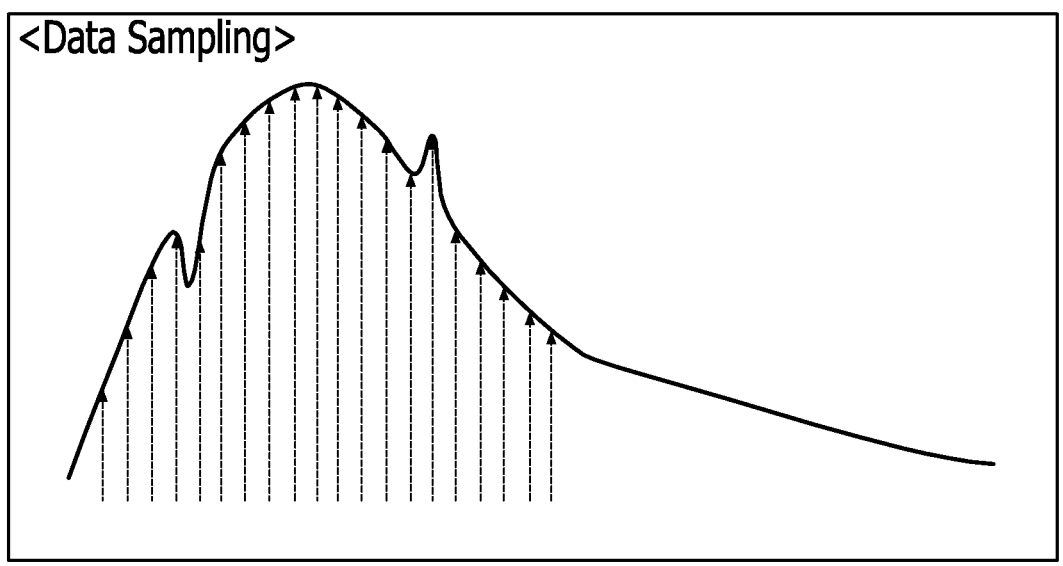
FIG. 6 is a diagram for describing a sampling operation which is performed to detect a one-period time of the current waveform detected during rotation of the motor, in FIG. 5.

FIG. 6 is a diagram for describing a sampling operation which is performed to detect the one-period time of the current waveform detected during rotation of the motor, in FIG. 5.

In order to calculate the one-period time t of each of the waveforms generated during rotation of the motor, the controller 200 samples the waveform generated during rotation of the motor (i.e. the waveform amplified through the current signal amplifier 110) or data as illustrated in FIG. 6, in step S101.

At this time, the higher the sampling speed (or the larger the sampling interval), the more advantageous it is to determine the shape of the current waveform. However, the sampling speed may be adjusted in consideration of influence on the load factor or the computation performance of the controller 200 (for example, CPU or MPU).

After sampling the waveform generated during rotation of the motor, the controller 200 detects slopes (arrows illustrated along the waveform of FIG. 7), using differences between adjacent sampling data, and determines (or detects) the maximum peak and the minimum peak using the number of slopes and the changes in slope based on the differences between the sampling data (for example, positive (+) slope and negative (−) slope), in step S102.

Figure 7:
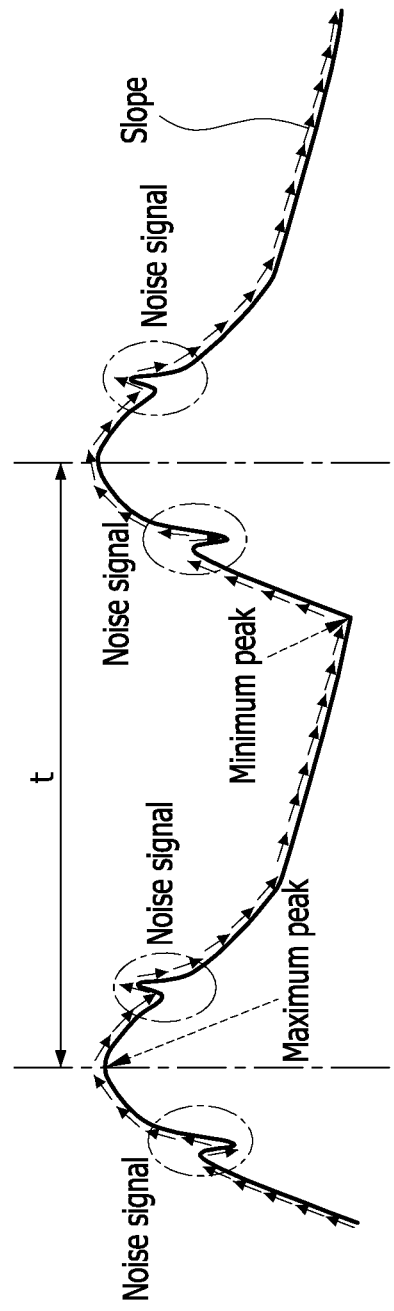
FIG. 7 is a diagram for describing a method for determining maximum and minimum peaks in order to determine the period of a current waveform using slopes between adjacent sampling data, in FIG. 6.

FIG. 7 is a diagram for describing a method for determining maximum and minimum peaks in order to determine the period of a current waveform using slopes between adjacent sampling data, in FIG. 6.

For example, as illustrated in FIG. 7, the controller 200 accumulates slopes (i.e. positive (+) slopes) between adjacent sampling data, maintains a predetermined number or more of slopes (i.e. the number designated according to the sampling speed and the specification of the motor), and then determines (or detects) a point, where the slope changes to a slope with a different characteristic (i.e. negative (−) slope), as the maximum peak.

Furthermore, the controller 200 accumulates slopes (i.e. negative (+) slopes) between adjacent sampling data, maintains a predetermined number or more of slopes (i.e. the number designated according to the sampling speed and the specification of the motor), and then determines (or detects) a point, where the slope changes to a slope with a different characteristic (i.e. positive (+) slope), as the minimum peak.

At this time, the number of slopes between the sampling data is continuously accumulated until the respective points (for example, the maximum peak and the minimum peak) are determined, and the number of slopes between sampling data in a noise signal which is temporally generated during rise or fall of the waveform is also accumulated. The noise signal illustrated in FIG. 7 is exaggerated in order to promote understandings. Therefore, although the slope characteristic temporally changes at a portion where a noise signal is generated (for example, positive (+) slope→negative (−) slope or negative (−) slope→positive (+) slope), the accumulated number of slopes with the same characteristic does not reach the predetermined number. Thus, the controller 200 determines that the portion where the slope characteristic changes (that is, the portion where the slope characteristic temporally changes to a different characteristic in comparison to the characteristics of all the accumulated slopes) is a noise signal, and filters the noise signal, in step S103.

Thus, when the same characteristic (for example, the maximum peak) is determined (detected) from the waveform whose noise signal is filtered, the controller 200 calculates the one-period time t based on the sampling speed and the accumulated number of sampling data between the characteristics (for example, the maximum peaks), calculates the one-rotation time (T=t*N) using the number N of commutators of the motor, which is already known information, and then calculates the motor RPM (=60 sec/T) using the one-rotation time (T=t*N) in step S104.

However, when the one-period time t is calculated, a difference may occur in the number of noise signals included in each of the waveforms, and the shape of the waveform may be partially changed depending on the rotation state of the motor. Thus, a difference may partially occur in the one-period time t of each of the waveforms. Therefore, a difference may also partially occur in the motor RPM calculated through the one-period time t.

Therefore, in order to reduce an error rate of the calculated motor RPM and to improve the reliability, the controller 200 may apply a moving average method to the motor RPM calculated from each of the waveforms, and ignore data (i.e. motor RPM) which are less than or more than the minimum/maximum value of a physical variation in the motor RPM. Thus, the controller 200 may additionally perform RPM calculation data processing to correct an error of the calculated motor RPM in step S105.

In accordance with the present embodiment, the apparatus and method for estimating a motor RPM can estimate the RPM of the motor more accurately while driving power is applied to the DC motor used for the electronic brake system, reduce noise generation while improving motor control performance, and reduce a motor RPM estimation error by a motor sample deviation.

Although the present disclosure has been described with reference to the embodiments illustrated in the drawings, the embodiments are for illustrative purposes, and those skilled in the art will appreciate that various modifications and other equivalent embodiments are possible from the embodiments. Thus, the true technical scope of the disclosure should be defined by the following claims. Furthermore, the embodiments described in this specification may be implemented as a method, a device, a software program, a data stream or a signal, for example. Although the embodiments have been discussed in only the context of a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims

What is claimed is:

1. An apparatus for estimating a motor rotation per minute (RPM) in an electronic brake system, comprising:
a current signal amplifier configured to amplify a signal waveform of a voltage applied across a motor driver by a current which flows while the motor driver is turned on, the motor driver being included in a motor driving circuit configured to apply motor driving power to a motor or remove the motor driving power according to a switch-on/off of the motor driver; and
a controller configured to detect a waveform with a one-period time from periodically repeated waveforms by processing the signal waveform amplified by the current signal amplifier, calculate a one-rotation time based on the one-period time and a number of commutators of the motor, and calculate a motor RPM using the one-rotation time.

2. The apparatus of claim 1, wherein the voltage applied across the motor driver is a voltage corresponding to (motor current*resistance of motor driver).

3. The apparatus of claim 1, wherein the number of the periodically repeated waveforms corresponds to the number of commutators of the motor.

4. The apparatus of claim 1, wherein the controller is configured to:
sample signal waveforms which are generated during rotation of a motor as sampling data;
detect slopes using differences between adjacent sampling data;
determine a maximum peak and a minimum peak using slope changes based on differences between the sampling data and an accumulated number of slopes; and
calculate the one-period time using a sampling speed and a number of sampling data accumulated between the maximum peak and the minimum peak.

5. The apparatus of claim 4, wherein the controller is configured to:
accumulate positive slopes between adjacent sampling data;
maintain a predetermined number or more of positive slopes;
determine a point where the slope changes to a negative slope as the maximum peak;
accumulate negative slopes between adjacent sampling data;
maintain a predetermined number or more of negative slopes; and
determine a point where the slope changes to a positive slope as the minimum peak.

6. The apparatus of claim 5, wherein the predetermined number of accumulated slopes is designated according to a specification of the motor and the sampling speed.

7. The apparatus of claim 4, wherein the controller is configured to:
continuously accumulate the number of slopes between the sampling data until a peak designated for period determination is determined; and
determine that a portion where a slope characteristic changes while the number of accumulated slopes having a same characteristic does not reach a predetermined number is a noise signal, and filter the noise signal.

8. The apparatus of claim 4, wherein the sampling speed or interval of sampling is set in consideration of influence on a load factor or a computation performance or of the controller.

9. The apparatus of claim 1, wherein the controller is configured to
apply a moving average method to the motor RPM calculated for each of the waveforms;
ignore a motor RPM which is less than or more than a minimum/maximum value of a physical variation in the motor RPM; and
additionally perform RPM calculation data processing to correct an error of the calculated motor RPM.

10. A method for estimating a motor rotation per minute (RPM) in an electronic brake system, comprising:
detecting and amplifying, by a current signal amplifier, a signal waveform of a voltage applied across a motor driver by a current which flows while the motor driver is turned on, the motor driver being included in a motor driving circuit configured to apply motor driving power to a motor or remove the motor driving power according to a switch-on/off of the motor driver;
detecting, by a controller, a waveform with a one-period time from periodically repeated waveforms by processing the signal waveform amplified by the current signal amplifier;
calculating, by the controller, a one-rotation time by multiplying the one-period time by a number of commutators of the motor; and
calculating, by the controller, a motor RPM using the one-rotation time.

11. The method of claim 10, wherein in order to calculate the one-period time of the waveform, the controller samples signal waveforms which are generated during rotation of a motor, detects slopes using differences between adjacent sampling data, determines a maximum peak and a minimum peak using slope changes based on the differences between the sampling data and an accumulated number of slopes, and calculates the one-period time using sampling speed and a number of sampling data accumulated between the maximum peak and the minimum peak.

12. The method of claim 10, wherein the voltage applied across the motor driver is a voltage corresponding to (motor current*resistance of motor driver).

13. The method of claim 10, wherein a number of the periodically repeated waveforms corresponds to the number of commutators of the motor.

14. The method of claim 11, wherein the controller accumulates positive slopes between adjacent sampling data, maintains a predetermined number or more of positive slopes, and then determines a point where the slope changes to a negative slope as the maximum peak, and
wherein the controller accumulates negative slopes between adjacent sampling data, maintains a predetermined number or more of negative slopes, and determines a point where the slope changes to a positive slope as the minimum peak.

15. The method of claim 14, wherein while continuously accumulating the number of slopes between the sampling data until a designated peak is determined, the controller determines that a portion where a slope characteristic changes while the number of accumulated slopes having a same characteristic does not reach a predetermined number is a noise signal, and filters the noise signal.

16. The method of claim 10, further comprising applying, by the controller, a moving average method to the motor RPM calculated for each of the waveforms, ignoring a motor RPM which is less than or more than a minimum/maximum value of a physical variation in the motor RPM, and performing RPM calculation data processing to correct an error of the calculated motor RPM, after the calculating of the motor RPM.

* * * * *